United States Patent [19]

Norman et al.

[11] 4,127,644
[45] Nov. 28, 1978

[54] PROCESS FOR HYDROGEN PRODUCTION FROM WATER

[75] Inventors: John H. Norman, La Jolla; Thomas S. Roemer, Cardiff, both of Calif.; Bruce E. Kirstein, Richland, Wash.; Karol J. Mysels, La Jolla, Calif.

[73] Assignee: General Atomic Company, San Diego, Calif.

[21] Appl. No.: 792,445

[22] Filed: Apr. 29, 1977

[51] Int. Cl.$^2$ .......................... C01B 1/03; C01B 7/14; C01B 7/18

[52] U.S. Cl. .................... 423/648 R; 423/317; 423/481; 423/500; 423/522; 423/539; 423/579; 423/658.5

[58] Field of Search ............... 423/648 R, 481, 522, 423/658.5, 500, 317

[56] References Cited

U.S. PATENT DOCUMENTS

| | | |
|---|---|---|
| 2,143,222 | 1/1939 | Heath ............................. 423/481 X |
| 3,044,862 | 7/1962 | Paul ............................... 423/500 X |
| 3,365,276 | 1/1968 | Childs et al. ...................... 423/648 R |
| 3,839,550 | 10/1974 | Wentorf, Jr. ...................... 423/648 R |
| 3,888,750 | 6/1975 | Brecher ........................... 423/539 X |
| 3,929,980 | 12/1975 | Abraham et al. ................. 423/648 R |
| 3,995,016 | 11/1976 | Kittle ............................. 423/648 R X |

*Primary Examiner*—Edward Stern
*Attorney, Agent, or Firm*—Fitch, Even, Tabin & Luedeka

[57] ABSTRACT

Hydrogen is produced from water by first reacting $I_2$, $SO_2$ and $H_2O$ to make hydrogen iodide and sulfuric acid. A substantial molar excess of $SO_2$ and $I_2$ in the reaction zone creates a lighter sulfuric acid-bearing phase and a heavier polyiodic-acid-bearing phase. The heavier phase is separated, degassed and then contacted with phosphoric acid to permit distillation of HI of low water content and recovery of $I_2$ as a separate fraction. Hydrogen is recovered from HI vapor, as by thermal decomposition.

20 Claims, 1 Drawing Figure

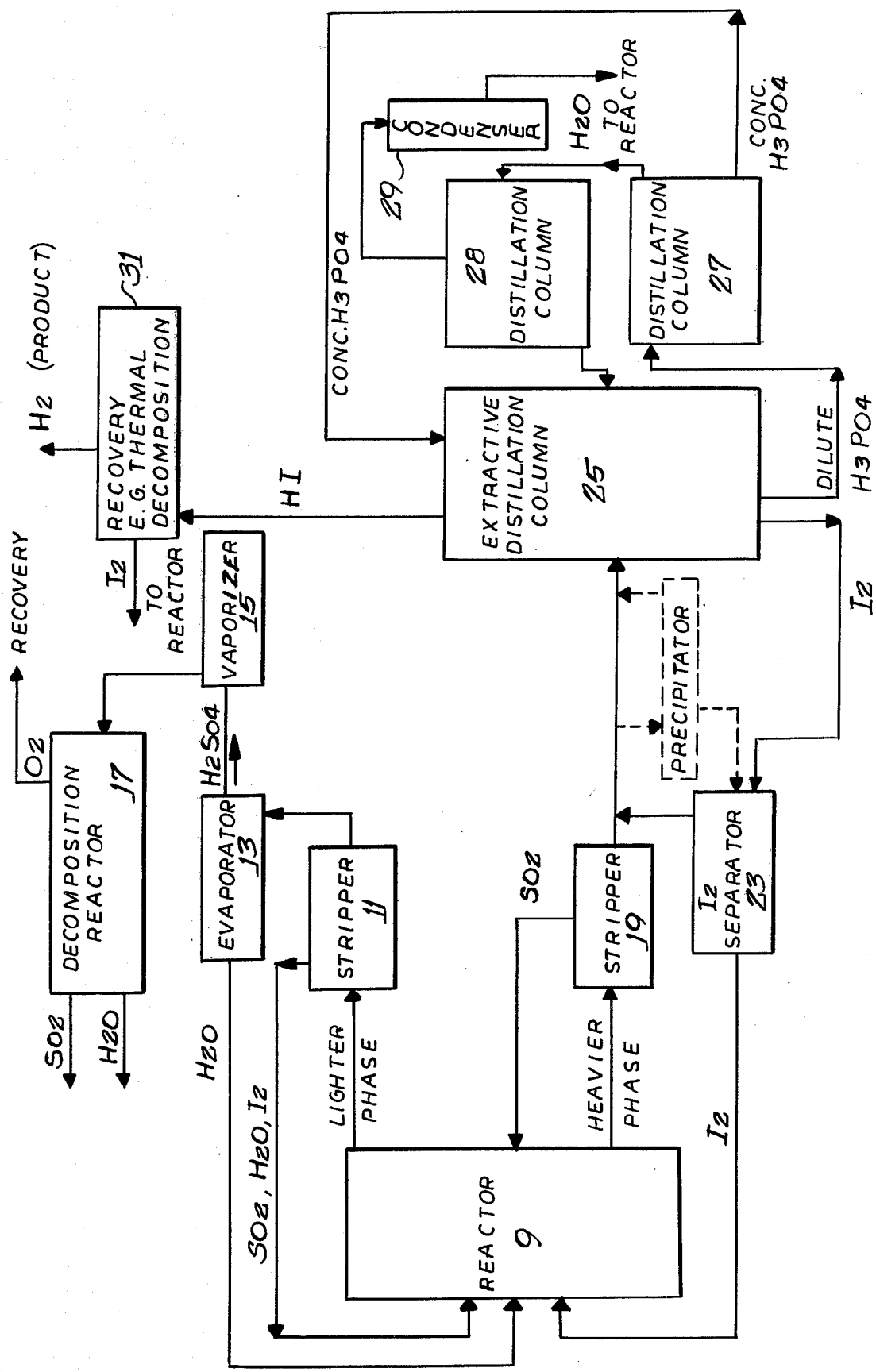

PROCESS FOR HYDROGEN PRODUCTION FROM WATER

This invention relates to the production of elemental hydrogen and more particularly to cycles for producing elemental hydrogen from water, especially those which utilize thermochemical reactions.

Certain nuclear reactors built for commercial power generation produce large quantities of quality (high temperature) heat, which has heretofore generally been used for the generation of steam to power turbines that drive electrical generators. Some solar collectors are also capable of producing sufficient quality heat, and these may also serve as sources of energy to thermochemical reactors.

The cost of producing hydrogen in commercial quantities has risen substantially with recent rises in the price of natural gas and petroleum feedstocks, from which hydrogen has heretofore generally been produced. Thus hydrogen is becoming a more valuable product. The electrolytic decomposition of water provides another way of producing elemental hydrogen; however, the high cost of electric power to effect such electrolytic decomposition has heretofore made this process economically impractical on a very large commercial scale.

In addition to its present chemical uses, hydrogen has often been mentioned as a possible way of storing energy until needed. By feeding stored hydrogen to fuel cells, or to combustion processes, electricity can be generated; however, the high cost of hydrogen has heretofore limited its use in such a fashion.

Various thermochemical cycles have been proposed for the creation of hydrogen, and from an efficiency standpoint, a number of these appear to be eminently sensible. However, from a practical standpoint, none of these thermochemical cycles has been without its drawbacks. For instance, the direct thermal decomposition of water requires temperatures well above 2000° C., which temperatures appear to render such a process impractical for commercial implementation in the near future.

Several series of chemical reactions have been proposed as cycles for arriving at the end result of creating hydrogen from water; however, these too have not been without their problems. For example, U.S. Pat. No. 3,929,980, issued Dec. 30, 1975 to Abraham et al., utilizes a series of steps which involve the reaction between crystalline iodine and molten potassium nitrate, and after several subsequent steps, it produces aqueous hydrogen iodide that is ultimately thermally decomposed to produce hydrogen. U.S. Pat. No. 3,839,550, issued Oct. 1, 1974 to R. H. Wentorf, Jr., teaches a closed-cycle thermochemical process for producing hydrogen by the decomposition of water that is keyed to the reaction of hot liquid iodine with lithium hydroxide to produce lithium iodide, which is in turn hydrolyzed to create hydrogen iodide, which is ultimately thermally decomposed to produce hydrogen. Both of these processes have fairly complex step-wise requirements and have not been proved to be economically practicable at the present time.

A further process has been proposed for producing thermochemically-decomposable hydrogen iodide as a part of a closed-cycle which is based upon the Bunsen reaction: $2H_2O + SO_2 + I_2 \rightarrow H_2SO_4 + 2HI$. This process is described in detail in copending patent application Ser. No. 786,009, filed Apr. 8, 1977. In this cycle, sulfur dioxide, water and iodine are reacted to produce sulfuric acid and hydrogen iodide under conditions which create a two-phase system. The heavier phase contains the desired hydrogen iodide product, and the lighter phase contains nearly all of the $H_2SO_4$. Although this overall process appears to have great promise, there is considered to be room for improvement in various of the individual steps.

One of the problems in producing $H_2$ from aqueous HI is that it is difficult to obtain anhydrous HI because HI forms an azeotrope of about 57 wt. percent (W/o) HI so that distillation of aqueous HI of subazeotropic composition, i.e., containing less than 57 w/o HI, produces a distillate rich in $H_2O$ and a residue approaching the azeotropic composition. Thus the production of anhydrous HI is not simple; however, the thermal decomposition of HI in the presence of water vapor requires additional heat in separation and recycling and is thus disadvantageous.

It is an object of the present invention to provide an improved cycle for the production of hydrogen from water based upon the Bunsen reaction. A further object of the invention is to provide a more efficient and economically more practicable process for producing elemental hydrogen, using the Bunsen reaction to produce a two-phase mixture, and then carrying out an improved separation of the components of the heavier phase. These and other objects of the invention will be apparent from the following detailed description when read in conjunction with the appended drawing of an illustrative flow sheet showing a presently preferred embodiment of the invention.

By carrying out the Bunsen reaction in the presence of an excess of both sulfur dioxide and iodine, relative to the amount of water available to take part in the reaction, a two-phase reaction system is created which is susceptible to liquid-liquid separation. The more dense or heavier phase contains the major fraction of the excess $SO_2$ and $I_2$ reactants plus the major portion of the hydrogen iodide that is produced. Most of the hydrogen iodide is present in the form of $HI_3$ and higher polyiodides, such as $HI_3$ and $HI_7$, which contribute to the distinct phase separation. Water serves not only as one of the reactants in the Bunsen reaction but also as a part of the medium wherein the reaction occurs, and both phases contain water.

It has been found that, after separating the two phases and removing unreacted $SO_2$ from the heavier phase, the addition of phosphoric acid to this phase will cause precipitation of the excess iodine plus the dissociation of the polyiodide acids. The HI, which is freed from the $HI_x$ by the dissociation and precipitation of the iodine, is created at a high chemical activity because the water of the heavier phase is now efficiently chemically bound by the $H_3PO_4$, and this increase is witnessed by an increase in the HI vapor pressure. Thus, if distillation and phosphoric acid addition are carried out simultaneously (extractive distillation), HI may be distilled away at distillate $HI-H_2O$ ratios far exceeding those of the residue, even though the $HI-H_2O$ ratio of the residue is subazeotropic. Precipitation of iodine and distillation of HI thus produces a residue liquid whose predominant components are $H_3PO_4$ and $H_2O$. This can be further heated, distilling out the $H_2O$ and thus reconcentrating the $H_3PO_4$. Thus the $H_3PO_4$ treatment facilitates the separation of $HI_x$ solutions into the components $I_2$, HI and $H_2O$.

The abbreviated chemical equations describing the overall thermochemical cycle, which is based upon the Bunsen reaction, are as follows:

$$2H_2O + SO_2 + I_2 \rightarrow H_2SO_4 + 2HI \quad (A)$$

$$H_2SO_4 \rightarrow H_2O + SO_2 + \tfrac{1}{2}O_2 \quad (B)$$

$$2HI \rightarrow I_2 + H_2 \quad (C)$$

The reaction products, sulfuric acid and hydrogen iodide, which result from the Bunsen reaction (A), are not separable by simple distillation techniques. However, if this reaction is carried out under appropriate conditions, wherein both an excess of sulfur dioxide and an excess of iodine are present, a two-phase system is created consisting of two distinct water-containing phases that can be efficiently separated. Of course, the Bunsen reaction is a reversible reaction which does not go to completion, and the equilibrium constants and kinetic considerations determine the extent to which the reaction proceeds. This fact, coupled with the fact that water is both a reactant and a solvent for both phases, renders precise definition of the relative amounts somewhat difficult. In general, although dependent somewhat upon the temperature, up to about 10 percent of the water which is present can take part in the reaction regardless of the excess amounts of $SO_2$ and $I_2$, with the remainder of the water fulfilling its function as a solvent component. Thus, it is appropriate to base any stoichiometric calculations upon such a 10 percent figure.

Sulfur dioxide must be present in excess to aid in driving the reaction to the right, and in order to facilitate the presence of the desired amount of sulfur dioxide in the reaction mixture, the reaction may be carried out under greater than atmospheric pressure. However, reduced temperatures, e.g., down as low as about $-60°$ C., might be used should it be desired to provide increased concentrations of $SO_2$ while remaining at atmospheric pressure. In general, operation at room temperature (i.e., about 21° C.) and atmospheric pressure maintains the sulfur dioxide at a sufficient chemical activity in the liquids as to effectively drive the reaction to the right. However, operation somewhat above the melting point of iodine (114° C.) may also be advantageous. Thus overall, the use of temperatures between about $-30°$ C. and about 150° C. is generally contemplated.

Gaseous $SO_2$ may be supplied by bubbling it through the liquid system where the reaction occurs, and it is convenient to simply carry out the reaction under saturation conditions with $SO_2$ at about atmospheric pressure. Under these conditions and room temperature, sulfur dioxide dissolves in the aqueous solution in a molar amount more than the stoichiometric amount of water (based upon 10 percent of the total amount of water present). Moreover, under these conditions additional $SO_2$ is continuously available to dissolve in the solution to replace that which reacts to form $H_2SO_4$.

As earlier indicated, iodine is also supplied in an excess amount (also based upon 10 percent of the water), and preferably iodine is supplied in an amount approaching the saturation concentration of iodine in the solutions. In addition to driving the Bunsen reaction to the right by the law of mass action, iodine complexes with the hydrogen iodide reaction product and creates hydrogen polyiodides ($HI_3$, $HI_5$, $HI_7$ etc.) and ultimately the distinct two-phase liquid system, thus further contributing to the efficiency of the system. If the reaction is carried out at room temperature and at a ratio of 0.5 gram of $I_2$ for each gram of $H_2O$, a single phase reaction system results that has the characteristic yellow color of the $HI.SO_2$ complex. However, as the amount of $I_2$ is increased, the liquid system takes on a darker color which is indicative of the presence of the polyiodides. The polyiodide acids, which are sometimes herein referred to as $HI_3$, are considered to be complexes wherein the HI and the $I_2$ have a stronger attraction for each other than exists between the HI and the $SO_2$.

When the $I_2$ level reaches about 1.8 grams per gram of $H_2O$, phase separation begins to occur; and above about 2 grams, a substantial separation of the two liquid phases (and thus a separation of the sulfuric acid and hydrogen iodide reaction products) is accomplished. The affinity of these polyiodide acids for water and the fact that the complexes thus formed with water reject the sulfuric acid solution are believed to account for the formation of the lighter phase which separates, with the chemical reaction continuing mainly in the heavier phase as all of the reactants are there at high concentrations. The reaction may be carried out as a batch reaction, but it is preferably rendered continuous as described hereinafter.

After separation of the heavier phase from the lighter phase, an initial filtering of the heavier phase may be performed to remove any solids, e.g., any undissolved iodine, that might possibly be present. Next, the heavier phase is degassed to remove the sulfur dioxide that did not react; thereafter, it is treated with phosphoric acid. Although the term "phosphoric acid" is generally used throughout this application, the term should be understood to include $H_3PO_4$ alongside $H_4P_2O_7$, $P_2O_5$ and other such dehydrated species, as well as aqueous solutions of $H_3PO_4$.

The dehydrating properties of phosphoric acid depend upon the $H_3PO_4$ concentration, which may vary from about 50 weight percent to about 110 weight percent or more, and this has an important effect upon its interaction with the heavier phase. It has been found that, as a result of phosphoric acid addition and its interacting to bind the water, a substantial amount of iodine precipitation occurs. Depending upon the temperature, iodine separates as either a liquid or a solid. The end result is a breakdown of the complexing between the iodine and the HI (which originally created the $HI_3$ and other higher polyiodides), and the precipitation of iodine occurs along with the formation of HI as the prevalent hydrogen iodide species. This breakdown is favored by the removal of the HI according to the laws of chemical equilibrium.

The phosphoric acid treatment may, if desired, be effected in two steps. In the first step the heavier phase is mixed with phosphoric acid so as to form two phases, one rich in iodine the other rich in HI, and these two phases are separated. This operation may be conducted either below the melting point of iodine or above it, e.g., between about room temperature and about 150° C. However, higher temperatures require superatmospheric pressure to prevent undue volatilization of some components. In the second step, the HI-rich phase is distilled to remove, as an overhead stream, HI which contains little, if any, water. The phosphoric acid solution remaining from the second step is concentrated by distillation for reuse in the first step.

A more complete and more convenient separation of the components is obtained in a continuous treatment method wherein distillation of the HI proceeds along with the precipitation of the iodine as explained hereinafter. The temperature is preferably maintained above the melting point of $I_2$, viz. about 115° C., and it must be high enough to cause boiling and distillation of the aqueous phase containing phosphoric acid and HI. Temperatures as high as 150° C. or even up to about 250° C. may therefore be employed depending on the $H_3PO_4$ concentration and the pressure.

The amount and concentration of phosphoric acid used depends on a number of factors, such as the completeness of separation desired, the amount of recycle allowed, the desired degree of dehydration of the HI, and the flow scheme employed. In general, in order to obtain substantially anhydrous HI, the concentration of $H_3PO_4$ in the stream being supplied should exceed 80 w/o and preferably exceed 90 w/o. It has been found that addition of a sufficient amount of phosphoric acid will so reduce the activity of the water that the vapor pressure of the HI will exceed the vapor pressure of the water at all $HI/H_2O$ ratios. In order to expel by distillation the major part of HI, this concentration of $H_3PO_4$ at the point where it is most dilute, i.e., in the bottoms, should not fall below 60 w/o and preferably not below about 80 w/o. Because, per pass, the phosphoric acid can only remove from the heavier phase the amount of water corresponding to the difference between its most concentrated and most dilute state in the cycle, in order the reduce the rate of cycling of the $H_3PO_4$, it is clear that there are advantages to using acid of 100 w/o or more concentration. This is balanced however by the increasingly high temperatures required to subsequently dehydrate $H_3PO_4$ as its concentration increases.

A continuous method of carrying out the invention is depicted in the accompanying FIGURE wherein the main reaction, in accordance with the Bunsen equation, is carried out in a first reactor 9. Reaction conditions are maintained by metering in the water and iodine at the desired rates and by continuously supplying $SO_2$ so as to maintain the reaction mixture saturated in $SO_2$ at one atmosphere pressure and 90° C. As previously indicated, a two-phase liquid system is created. The lighter and heavier phases are continuously separately drawn off, and different treatments of each are effected.

The lighter phase is preferably heated in a stripper 11 to first drive off most of the sulfur dioxide, water and iodine, for example by employing a temperature of about 200° C. at atmospheric pressure. These vapors are condensed and recovered for reuse. Non-atmospheric pressures may be used, if desired, to substantially change the temperature. The degassed aqueous sulphuric acid stream is then supplied to an evaporator 13 to separate the remaining water (along with any residual iodine). Thereafter, the sulfuric acid is then heated in a vaporizer 15 at a temperature of at least about 335° C. (which is its boiling point at 1 atm.).

The sulfuric acid vapors are then treated, in a known manner, so as to transform the acid into water and sulfur trioxide, which in turn breaks down, generally in the presence of a catalyst, to sulfur dioxide and oxygen at high temperatures. See for example, U.S. Pat. No. 3,888,750, issued June 10, 1975 to Brecher et al., wherein the thermochemical decomposition of sulfuric acid with the resultant production of oxygen, sulfur dioxide and water is illustrated and described in detail. Preferably, the sulfuric acid vapors are transferred to a decomposition reactor 17 wherein a temperature between about 400° C. and about 950° C. is maintained and wherein the sulfuric acid is catalytically decomposed to produce water, sulfur dioxide and oxygen. The water and sulfur dioxide are recycled to the main reactor 9, and oxygen may be recovered as a by-product.

The heavier phase is preferably passed first to a stripper 19 where excess sulfur dioxide is removed by subjection to a vacuum and/or mild heating to increase its vapor pressure. The resultant degassed stream is then conducted to an extractive distillation column 25 where it is introduced on a plate generally near the middle of the column. The bottom of the column is maintained at about 130° C. or above. Concentrated phosphoric acid is supplied to the top of the column 25 and becomes enriched in water as it flows down the column 25, whereas the vapor, which is flowing countercurrently up the column, becomes more and more enriched in hydrogen iodide. In addition, the action of the phosphoric acid in reducing the chemical activity of the water has the effect of causing iodine to precipitate from the aqueous solution at locations below the plate at which the stream is introduced. Thus, the bottoms from the column 25 include dilute phosphoric acid and iodine as two nearly immiscible fractions or layers. Depending upon the way the column is operated, and in particular upon the concentration of phosphoric acid at this point, the bottoms may be substantially free of HI or may contain a significant amount dissolved in the aqueous layer. Preferably, the column is operated so that the one bottom fraction contains less than about 0.1 w/o of HI, based upon $H_2O$, $H_3PO_4$ and HI. The iodine layer is separated from the remainder of the bottoms, and it may then be cleaned up in a separator 23, where minor amounts of contaminants are removed and returned to the column 25 with the stream from the stripper 19, before being recycled to the main reactor 9.

The operation of the column 25 is such that the ratio of water to HI in the dilute phosphoric acid reaching the bottom of the column is higher than the azeotropic $H_2O/HI$ weight ratio (about 0.75). The bottoms from the column 25 are then circulated to a second column 27 wherein the phosphoric acid is reconcentrated for return to column 25. The overhead stream from column 27 may or may not contain a significant amount of HI depending on the operation of column 25. If the amount of HI in the overhead stream is negligible, this overhead stream is basically water which may be returned to reactor 9. If the amount HI is significant but of a definite subazeotropic proportion, the overhead stream is directed to a still 28 which generates an overhead stream of essentially pure water for return to reactor 9 plus bottoms in which the HI is concentrated to about its azeotropic concentration. The bottoms are returned to the extractive distillation column 25 at the appropriate level.

If it is desired to precipitate some of the iodine prior to extractive distillation, a precipitator (shown in dotted outline) may be provided in which the heavier phase is treated with either some fresh concentrated phosphoric acid or with a sidestream from column 25 which is rich in phosphoric acid. The precipitated iodine is sent to separator 23, while the remainder becomes the stream which is introduced into the extractive distillation column 25.

The distillate from column 25 has a very high percentage of hydrogen iodide and may be further dried, if desired, to even further reduce the minor percentage of water. The HI is then transferred to a hydrogen recovery installation 31 where it is treated to recover hydrogen (either as molecular hydrogen or as a hydrogen-containing compound) and iodine, for example, by heating to the appropriate temperature for thermal decomposition, which may be from 114° C. to 500° C. or more depending on the system and whether a catalyst is used, or by decomposing in some other manner such as photolytically as described in U.S. Pat. No. 3,995,016, issued Nov. 30, 1976 to P. A. Kittle. The very top of column 25, if desired, need not contain any phosphoric acid but could act as a simple rectifying section wherein water is stripped from the super-azeotropic hydrogen iodide. The reflux stream must be cooled to low temperatures in this case. However, preferably, the concentrated phosphoric acid (at least about 90 w/o $H_3PO_4$) which is obtained from the bottoms of the column 27 is introduced at the very top of the first distillation column, as previously indicated and as illustrated. This concentrated phosphoric acid stream can also be used to supply all or part of the phosphoric acid-rich liquid which may be supplied to a precipitator.

As an example of the practicality of the chemistry involved, a batch reaction is carried out using about 300 grams of water, about 200 grams of sulfur dioxide and about 880 grams of iodine, at atmospheric pressure and at a temperature of about −10° C. The reaction proceeds readily under these conditions, and the formation of two distinct phases is observed. The lower, heavier phase is generally very dark in color, and a sample of it is drawn off, filtered and degassed. Analysis of the degassed heavier phase shows that it contains about 20 w/o HI, about 20 w/o water and about 60 w/o iodine.

A sample of about 14 grams of the degassed heavier phase is combined with about 33 grams of 100 percent $H_3PO_4$, and a wet precipitate is separated which weighs about 13.9 grams. Analysis shows the wet precipitate to contain about 51.2 percent iodine, about 2.9 percent HI, about 41 percent $H_3PO_4$, and the remainder water. This constitutes nearly 85 percent of the recoverable $I_2$.

A slightly less concentrated HI sample than that from the above separation procedure, e.g., one having an $H_2O$ to HI weight ratio of about 2.48:1, is subjected to distillation in an Othmer still having a single plate which condenses and refluxes all of the distillate. The still is operated for a sufficient time to approach steady-state composition at a temperature of about 185° C. Sampling of the material from the upper condenser shows that the distillate contains about 54.7 percent HI, about 0.7 percent $I_2$ and the rest water. A sample of the bottoms from the pot shows that the sample analyzes about 91.3 percent $H_3PO_4$, about 2.5 percent HI, and the remainder water. Thus it is shown that a liquid having a water to HI weight ratio of about 2.48, after distillation in a one-plate still, produces a distillate whose water to HI ratio is about 0.81 — equal to an improvement by about a factor of 3. Further studies show that increasing the amount of phosphoric acid used results in a reduction to a ratio below the azeotropic ratio of 0.75. Studies also show that similar ratio reductions, upon distillation, can be accomplished if proportionately greater amounts of less concentrated $H_3PO_4$, e.g., 85 w/o $H_3PO_4$, are substituted for the 100 percent $H_3PO_4$.

The above demonstrates the effectiveness of $H_3PO_4$ in not only precipitating excess iodine from the degassed heavier phase, but in also creating a resultant liquid which can be distilled to recover HI. Providing concentrated $H_3PO_4$ at the top of the still into which the supernatent from a precipitator is fed achieves an extremely effective separation of HI via extractive distillation. Thus, the invention is considered valuable in recovering HI from a solution consisting essentially of polyiodic acids and water of subazeotropic proportions, regardless of its genesis. "Consisting essentially of" is meant to indicate that no other components are included which would form an azeotrope with either water or HI, and "subazeotropic" means a w/o of HI less than 57 percent. Substantially anhydrous HI, for purposes of this application, is considered to mean HI containing no more than about 5 w/o $H_2O$.

Although the invention has been described with respect to certain preferred embodiments, it should be understood that modifications as would be obvious to one having the ordinary skill of the art may be made without deviating from the scope of the invention which is defined by the appended claims. Various of the features of the invention are set forth in the claims which follow.

What is claimed is:

1. In a process for the production of hydrogen from water, wherein $H_2O$, $SO_2$ and $I_2$ are reacted in the presence of an excess amount of $I_2$ and $SO_2$ to produce sulfuric acid and hydrogen polyiodides in the form of a two-phase liquid system and wherein the heavier phase containing the major portion of the hydrogen polyiodides, which are complexes of HI and $I_2$, is separated from the two-phase liquid system, degassed to remove unreacted $SO_2$ and treated for hydrogen recovery, the improvement comprising treating said separated heavier phase with phosphoric acid that contains at least about 50 weight percent $H_3PO_4$ to bind $H_2O$ in said separated phase and precipitate $I_2$ therefrom and distilling said phosphoric acid-treated liquid phase to separate hydrogen iodide therefrom and passing said separated hydrogen iodide to a hydrogen recovery zone.

2. The invention in accordance with claim 1 wherein said separated hydrogen iodide comprises substantially all the hydrogen iodide initially present in said heavier phase.

3. The invention in accordance with claim 1 wherein said distillation is carried out at a temperature between about 115° C. and about 250°C.

4. The invention in accordance with claim 1 wherein an initial precipitation and separation of $I_2$ is carried out prior to said hydrogen iodide distillation.

5. The invention in accordance with claim 4 wherein said precipitation is carried out at a temperature between about ambient and about 150° C.

6. The invention in accordance with claim 1 wherein phosphoric acid is added during said distilling step in an amount and at a concentration sufficient to create an aqueous fraction containing at least 50 w/o $H_3PO_4$ following said separation of hydrogen iodide.

7. The invention in accordance with claim 3 wherein phosphoric acid is added during said distilling step in an amount and at a concentration sufficient to create an aqueous fraction containing at least 80 percent $H_3PO_4$ following said separation of hydrogen iodide.

8. The invention in accordance with claim 7 wherein said aqueous fraction is substantially free of hydrogen iodide.

9. The invention in accordance with claim 6 wherein said process is continuous and wherein the $H_3PO_4$ bottoms from said distillation step are separated from precipitated iodine and are subsequently distilled to remove water and recover concentrated phosphoric acid, which is returned to said hydrogen iodide distillation step.

10. The invention in accordance with claim 1 wherein said heavier phase is subjected to extractive distillation in the presence of sufficient phosphoric acid to produce HI containing less than 5 w/o water plus two bottom fractions, one fraction containing $H_3PO_4$ plus water and HI in subazeotropic proportions and the other fraction containing iodine, subjecting said one bottom fraction to further distillation to produce substantially pure water, concentrated $H_3PO_4$ and a sidestream containing an azeotropic concentration of hydriodic acid, and returning said sidestream to said extractive distillation step.

11. A process for the thermochemical production of hydrogen from water comprising the steps of
reacting $H_2O$, $SO_2$ and $I_2$ in the presence of an excess amount of $I_2$ and $SO_2$ to produce sulfuric acid and hydrogen polyiodides and create a two-phase liquid system wherein the heavier phase contains the major portion of said hydrogen polyiodides, which are complexes of HI and $I_2$,
separating the heavier phase from the two-phase liquid system,
degassing said heavier phase to remove unreacted $SO_2$,
subjecting said degassed liquid to extractive distillation in the presence of phosphoric acid that contains at least about 50 w/o $H_3PO_4$ so as to remove a substantial fraction of the HI present as gaseous HI in an overhead stream, to precipitate $I_2$ as one fraction of the bottoms and to create another bottom fraction containing aqueous phosphoric acid,
decomposing said gaseous hydrogen iodide to recover hydrogen and iodine, and
processing said lighter phase to produce $SO_2$, $H_2O$ and $O_2$.

12. The process of claim 11 wherein said extractive distillation is carried out so that said other bottom fraction contains not more than 0.1 w/o HI based upon $H_2O$, $H_3PO_4$ and HI.

13. The process of claim 11 wherein said other fraction is further separately distilled and the HI contained in said other fraction is recovered as an aqueous solution of substantially azeotropic composition and returned to said extractive distillation step.

14. The process of claim 13 wherein said HI recovery is effected by a two-stage distillation wherein the first stage separates a concentrated phosphoric acid bottom fraction for return to said extractive distillation and an aqueous HI overhead and wherein the second stage separates water as overhead and said aqueous solution of substantially azeotropic composition as the bottoms.

15. A process for separating the components of a liquid consisting essentially of iodine and HI in the form of polyiodic acids and water in subazeotropic proportions, which process comprises
treating said liquid with phosphoric acid that contains at least about 50 weight percent $H_3PO_4$ so as to precipitate and separate iodine therefrom and reduce the activity of the water therein to the point that the vapor pressure of the HI exceeds the vapor pressure of the water and subsequently distilling said treated liquid to produce gaseous HI.

16. The process of claim 15 wherein said distilling includes extractive distillation in which gaseous HI is produced as overhead and an $I_2$-rich phase is produced as one fraction of the bottoms.

17. The process of claim 15 wherein said phosphoric acid has a concentration equal to at least 85 w/o $H_3PO_4$.

18. The process in accordance with claim 16 wherein said extractive distillation step employs concentrated phosphoric acid and wherein the $H_3PO_4$ bottom fraction from said extractive distillation step is further separately distilled to provide concentrated phosphoric acid for use in an earlier step.

19. The process of claim 16 wherein said extractive distillation is carried out at a temperature of at least about 115° C. and in a manner so that the other bottom fraction contains not more than 0.1 w/o HI based upon $H_2O$, $H_3PO_4$ and HI.

20. The process of claim 16 wherein the other bottom fraction is further separately distilled and the HI contained in said other fraction is recovered as an aqueous solution of substantially azeotropic composition and returned to said extractive distillation step.

* * * * *